(12) United States Patent
Heroux

(10) Patent No.: US 8,296,244 B1
(45) Date of Patent: Oct. 23, 2012

(54) METHOD AND SYSTEM FOR STANDARDS GUIDANCE

(75) Inventor: Richard W. Heroux, Port St. Lucie, FL (US)

(73) Assignee: CSRSI, Inc., Jensen Beach, FL (US)

( * ) Notice: Subject to any disclaimer, the term of this patent is extended or adjusted under 35 U.S.C. 154(b) by 0 days.

(21) Appl. No.: 13/336,334

(22) Filed: Dec. 23, 2011

Related U.S. Application Data

(62) Division of application No. 12/196,919, filed on Aug. 22, 2008.

(60) Provisional application No. 60/957,559, filed on Aug. 23, 2007.

(51) Int. Cl.
*G06Q 99/00* (2006.01)

(52) U.S. Cl. .......................... 705/317; 705/35

(58) Field of Classification Search .................. 705/317, 705/35
See application file for complete search history.

(56) References Cited

U.S. PATENT DOCUMENTS

| | | | |
|---|---|---|---|
| 7,467,135 B2 | 12/2008 | Coker et al. | |
| 2003/0229525 A1* | 12/2003 | Callahan et al. | 705/7 |
| 2004/0150662 A1* | 8/2004 | Beigel | 345/707 |
| 2004/0191743 A1 | 9/2004 | Chiu et al. | |
| 2006/0101520 A1* | 5/2006 | Schumaker et al. | 726/25 |
| 2006/0250524 A1* | 11/2006 | Roche | 348/581 |
| 2007/0209010 A1 | 9/2007 | West | |
| 2007/0288355 A1 | 12/2007 | Roland et al. | |

OTHER PUBLICATIONS http://pci.evolve-online.com (From Wayback machine May 6, 2007), 17 pages.*
Esecure Assessment Services (from Wayback Machine May 6, 2007), "Evolution Systems", website article, 17 pages, website: http://pci.evolve-online.com.

* cited by examiner

*Primary Examiner* — Janice A. Mooneyham
*Assistant Examiner* — Kira Nguyen

(57) ABSTRACT

A method and system for guiding end-users with respect to payment card data security standards. The system uses guidance questions that are worded simply and intelligibly so that end-users, regardless of their technical background or expertise, can understand the underlying issues and provide the proper answer. The guidance questions are generated from the PCI DSS SAQ and related guidance documents, to generate a list of positive, negative or non-applicable SAQ answers at the end of the process. The system generates action items with applicable policy statements for negative answers, if necessary, such that a completed questionnaire can be generated with all positive answers and sent to the authoritative entity. The system also generates vulnerability level reports based on the end-user's answers to assist the end-user and the host in assessing PCI DSS compliance readiness. The host can process the generated information, for example, to do risk analysis or risk management.

12 Claims, 12 Drawing Sheets

METHOD AND SYSTEM FOR STANDARDS GUIDANCE

CROSS-REFERENCE TO RELATED APPLICATIONS

This Application is a divisional application of application Ser. No. 12/196,919, filed Aug. 22, 2008, which claims priority to provisional application No. 60/957,559, filed Aug. 23, 2007, which is hereby incorporated by reference in its entirety.

BACKGROUND OF THE INVENTION

The Payment Card Industry Data Security Standard ("PCI DSS") was developed as a standard to help organizations that process credit, debit and stored value card payments 1) prevent credit card fraud, cracking and various other security vulnerabilities and threats; and 2) help facilitate the broad adoption of consistent data security measures on a global basis. The PCI DSS is a set of comprehensive requirements for enhancing payment account data security and is intended to help organizations proactively protect customer account data. The PCI DSS is a multifaceted security standard that includes requirements for security management, policies, procedures, network architecture, software design and other critical protective measures. A company processing, storing, or transmitting payment card data must be PCI DSS compliant or risk losing their ability to process credit card payments and being audited and/or fined.

Merchants and payment card service providers must validate their compliance periodically. This validation may be conducted by auditors—i.e. persons who are the PCI DSS Qualified Security Assessors ("QSAs"). Most companies, perform a Self Assessment Questionnaire ("SAQ"). The core of the PCI DSS is a group of principles and accompanying requirements, around which the specific elements of the DSS are organized.

Build and Maintain a Secure Network
  Requirement 1: Install and maintain a firewall configuration to protect cardholder data
  Requirement 2: Do not use vendor-supplied defaults for system passwords and other security parameters
Protect Cardholder Data
  Requirement 3: Protect stored cardholder data
  Requirement 4: Encrypt transmission of cardholder data across open, public networks
Maintain a Vulnerability Management Program
  Requirement 5: Use and regularly update anti-virus software
  Requirement 6. Develop and maintain secure systems and applications
Implement Strong Access Control Measures
  Requirement 7: Restrict access to cardholder data by business need-to-know
  Requirement 8: Assign a unique ID to each person with computer access
  Requirement 9: Restrict physical access to cardholder data
Regularly Monitor and Test Networks
  Requirement 10: Track and monitor all access to network resources and cardholder data
  Requirement 11: Regularly test security systems and processes
Maintain an Information Security Policy
  Requirement 12: Maintain a policy that addresses information security The SAQ consists of 227 questions related to computer security and compliance with the PCI DSS. It is a cumbersome and lengthy process that can be technically challenging to the unsophisticated. Many of the questions are complex, requiring an interpretation for non-expert users. The DSS is written from an Information Technology perspective, rather than a business process perspective, causing interrelated requirements to appear in different places throughout the various requirements. Guidance documentation is equally complex and there is no single document for a user of the DSS to find explanations and definitions.

BRIEF SUMMARY OF THE INVENTION

A method and system for guiding end-users with respect to payment card data security standards is presented. The system uses guidance questions that are worded simply and intelligibly so that end-users, regardless of their technical background or expertise in PCI, can understand the underlying issues and provide the proper answer. The guidance questions are generated from the PCI DSS SAQ and related guidance documents to generate a list of positive, negative or non-applicable SAQ answers at the end of the process. In particular, the system generates action items with applicable policy statements for negative answers, if necessary, such that a completed questionnaire can be generated with all positive answers and sent to the authoritative entity. The system also generates vulnerability level reports based on the end-user's answers to assist the end-user and the host in assessing PCI DSS compliance readiness. The host (bank or organization) can process the generated information, for example, to do risk analysis or risk management.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical system and method. Those of ordinary skill in the art will recognize that other elements are desirable and/or required in order to implement the present invention. However, because such elements are well known in the art, and because they do not facilitate a better understanding of the present invention, a discussion of such elements is not provided herein. The disclosure herein below is directed to all such variations and modifications to planning technologies known, and as will be apparent, to those skilled in the art.

I. Overview

Figure 1:
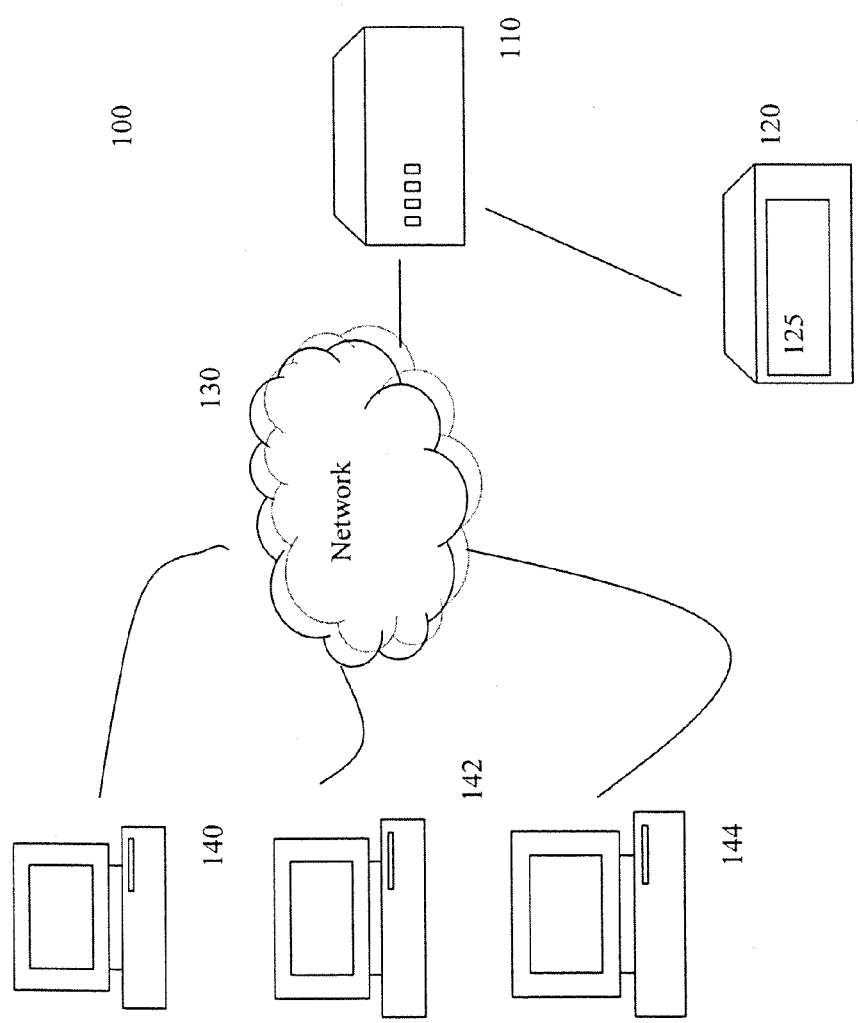
FIG. 1 is a transaction system including a standards guidance system according to an embodiment of the present invention.

Referring to FIG. 1, a transaction system 100 includes a host 110 such as for example, a bank or Independent Service Organization that is in communications with end-users 140, 142 and 144 such as for example, merchants, via for example, a network 130. Host 110 processes transactional information or provides related services, for example, security, for end-users 140, 142 and 144. System 100 includes an interactive Web based standards guidance system 125 that provides a set of tools to assist merchants who accept credit, debit or stored value card transactions (cards) in establishing computer security and compliance with the PCI DSS. Standards guidance system 125 may reside on a server 120 or on host 110.

Each end-user 140, 142 and 144 who accepts cards is required to file a compliance document with their bank, called a Self Assessment Questionnaire ("SAQ"). Depending upon how the end-user handles cards or card numbers the end-user must select and complete one of 4 SAQ forms. Standards guidance system 125 uses interviews styled to connect merchant business processes with the PCI DSS. Standards guidance system 125 generates questions from the SAQ, DSS and related guidance, and is written in plain language to link the compliance document with the merchants' business configuration. Containing help screens and glossaries, standards guidance system 125 takes an educational approach to guide the user towards continuous compliance through education.

Standards guidance system 125 determines how the merchant handles electronic transactions—such as by a Point of Sale (POS) terminal or online—and tailors the questions to fit those criteria. Standards guidance system 125 then presents the merchant with a series of questions one at a time, the answers to which account for every facet of the SAQ. The answer to one question logically gives rise to the next. In this logic tree, if the merchant does not know the answer to a particular question, the merchant can skip it and go to the next question. The unanswered question is sent to the back of the logic tree. But the question will always return, and it will be presented up to three times. And if it's skipped the third time, the question will be put on a task list. To help the merchant avoid mistakes—and reassure the host that the merchant is answering the questions honestly—questions are repeated in different formats.

Standards guidance system 125 allows interruption and resumption of interviews, holds the merchant policies for future reference and download, connects the tasks assigned to non-compliant items with the SAQ and maintains a record of required attestations from the merchant.

Standards guidance system 125 also functions like an online form filler that automates the tedious labor of filling out a consumer's personal information by completing an online form. As each question is answered, the toolkit simultaneously populates all SAQ questions pertinent to that response, saving the merchant the time and the headache of having to replicate the same information across many questions. As the toolkit guides the merchant through the SAQ, the service compiles a customized task list that addresses critical issues the merchant must address in order to gain compliance. The merchant can tackle any issue on that list in any order. And when the issue has been resolved, standards guidance system 125 automatically updates the SAQ to include the amended information.

Standards guidance system 125 also has an educational aspect. Along the way, merchants will likely learn much about the various aspects of compliance—and their own businesses—as they answer the questions, since links are provided for the terminology that appears in each question. Clicking on a link takes the merchant to a concisely worded definition of the term. Appropriate tips and explanations are also provided to help merchants better understand the complexities of PCI. In this way, standards guidance system 125 is immersive and interactive and lets merchants proceed at their own pace. The toolkit also assists merchants in the area of the quarterly network security scan required under PCI DSS.

Standards guidance system 125 also provides hosts the ability to track their merchants' progress toward meeting the PCI standards. Standards guidance system 125 allows hosts to monitor merchants' activities in the PCI arena. On a live, real-time basis, hosts can determine which questions the merchants have answered, which questions have not been answered and the timeframe for when the activities under question took place. Many merchant actions when using standards guidance system 125 are time-stamped. This way, hosts can derive valuable information on any given merchant's PCI status. Banks are required to assess and manage the risk of data loss caused by non-compliance of merchants. Thus, standards guidance system 125 helps hosts manage and assess the risk level of every merchant in their portfolios.

II. System and Object Detail

Standards guidance system 125 of FIG. 1 may include a multiplicity of integrated components and at least one logical and/or relational database. It may utilize, for example, SQL scripts, dynamic link libraries (DLL) that link the information data, and HTML, AJAX, xml, or ASPX templates.

Standards guidance system 125 includes a set of inter-functional elements that drive the operation of standards guidance system 125 and a Website interface element for interactions between the end-user and standards guidance system 125.

Figure 2:
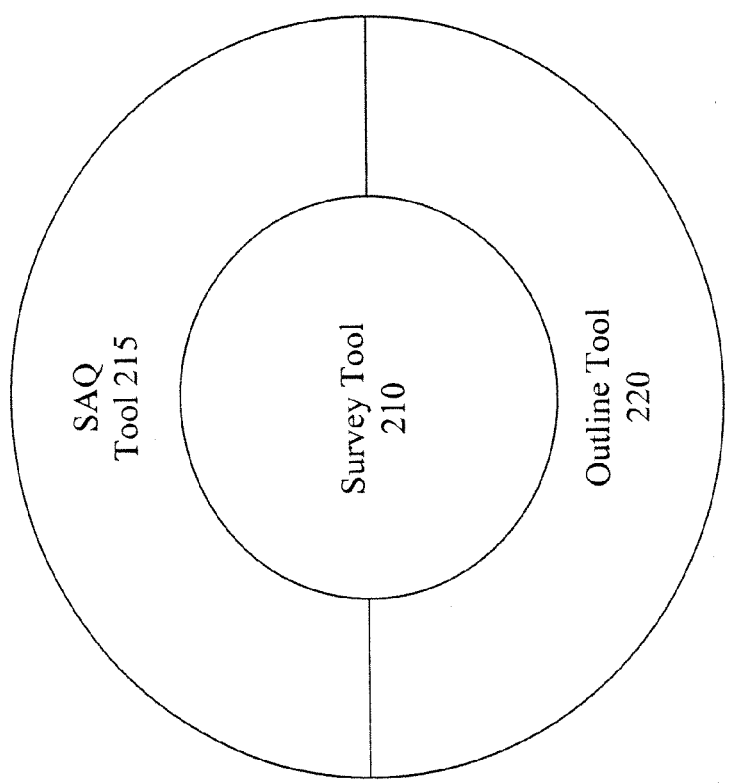
FIG. 2 is an inter-relationship diagram of specific modules or subsystems of a standards guidance system according to an embodiment of the present invention.

Referring now to FIG. 2, the inter-functional elements include a survey tool 210, an SAQ tool 215 and an outline tool 220. Survey tool 210 is used to construct interviews, relate tasks and SAQ responses to specific interview questions, specify and assign tasks for incomplete items, select policies, control the help and glossary screens, and assign answers to the SAQ. When construction is complete or changes are made survey tool 210 contains scripts to update the SQL Engine, for example, that operates the Web data. Survey tool 210 uses a question/answer logic methodology that determines applicability of future questions and skips or increases questions as needed. For example, the merchant who answers NO to: "Do you allow wireless access?" does not answer all the associated questions for wireless access. The system knows which questions to answer and answers them for the merchant. The user moves seamlessly to the next subject area. In particular, survey tool 210 for example, 1) maps, numbers and groups SAQ questions; 2) establishes and controls help and glossary catalogs; 3) designates and controls the behavior of answers; 4) establishes parent relationships among SAQ questions; 5) maps numbers and groups policies for outline too 220; and 6) establishes tasks to be assigned to merchants at the end of the interview. SAQ tool 215 is: 1) a catalog of all possible SAQ questions and their answers; and 2) assigns a vulnerability group to each SAQ question and is explained in detail below. Outline tool 220 is a catalog of policies that are given to merchants at the end of the interview.

Figure 3:
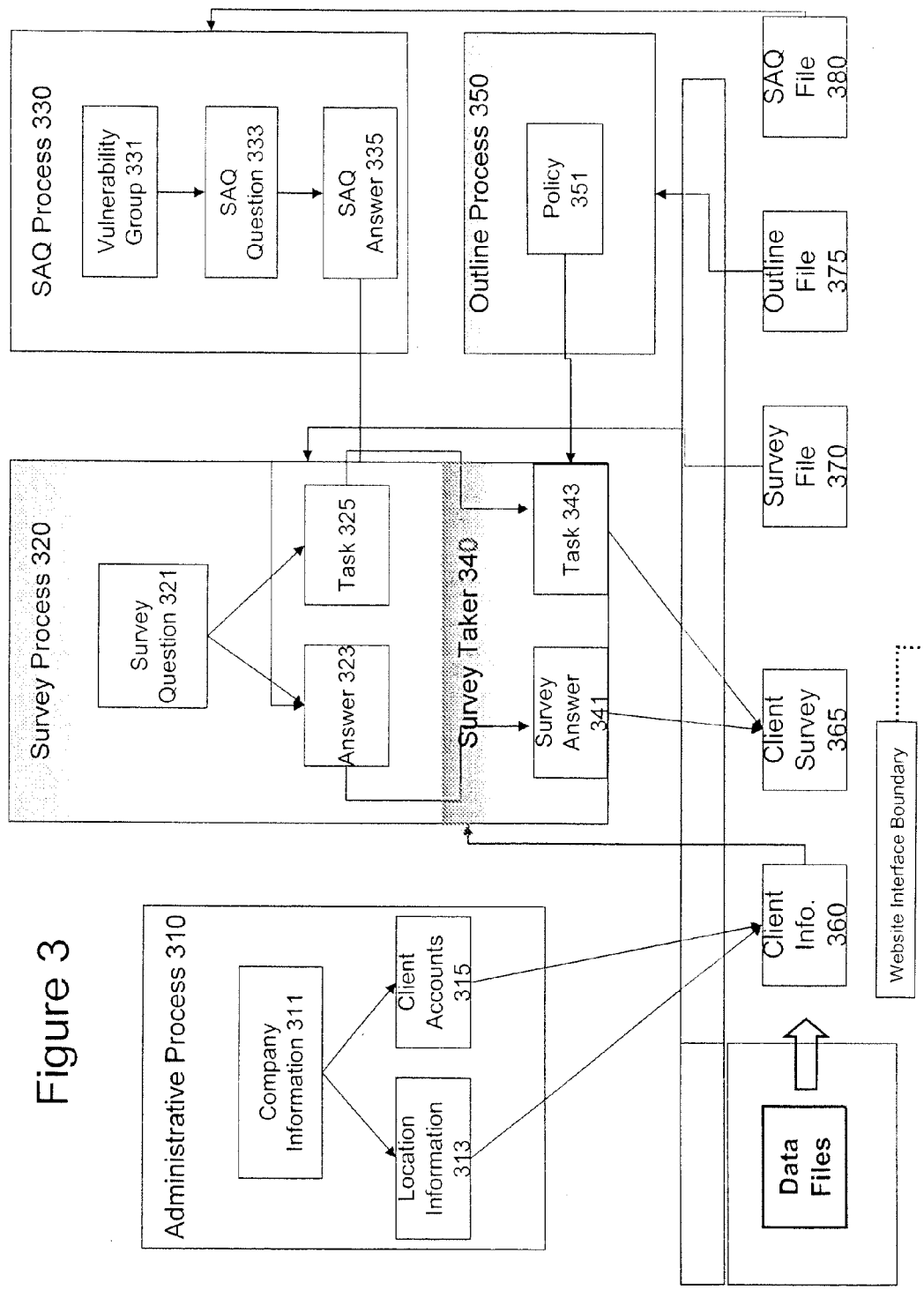
FIG. 3 is a top level functional process diagram of a standards guidance system according to an embodiment of the present invention.

The inter-functional elements are discussed in further detail with respect to FIG. 3 that demonstrates the object relationship between the tools and processes contained in standards guidance system 125. The primary objects are administrative process object 310, survey process object 320, SAQ process object 330, survey taker object 340 and outline process object 350. In addition, there are associated databases, client information 360, client survey 365, survey file 370, outline file 375 and SAQ file 380. Referring back to FIG. 2, survey tool 210 is related to survey process 320 and survey taker 340.

Administrative process object 310 is a host or client input object that takes in information about the end-user 311, end-user's location 313 and relationship to a particular host 315. This information is stored in client information 360 and is used by survey taker object 340 as an index to match up end-users, hosts, multiple transaction sites for specific end-users and other transaction specific information. Survey process object 320 is a catalog of survey questions 321 derived from SAQ, potential answers 323 and tasks 325, which are all stored in survey file 370. Survey taker object 340 processes the end-user selection of one of the answers 323 and captures it as survey answer 341 using the information stored in client information 360. Survey taker object 340 may also process an associated task 343 from tasks 325. Survey answer 341 and task 343 are stored in client survey 365. Outline process object 350 provides a policy 351, if applicable, from outline file 375 corresponding to task 343. SAQ process object 330 is provided an SAQ answer 335 by survey process object 320 for each SAQ question 333. SAQ questions 333 and SAQ answers 335 are stored in SAQ file 380. A vulnerability group 331, as discussed below, is determined for each SAQ answer 335. The assigned vulnerability level indicates the level of system risk from the end-user's system.

Website interface element includes an administrative module that provides a secure method for hosts to create user accounts for their end-user/merchant customers by either individual account or batch upload. It includes a risk analysis and reporting module that is a system of report screens, printable data and download files that shows vulnerabilities, merchant compliance status and incorporates drill down techniques to narrow the search for problems by comparative severity level.

A wizard is included to enable the merchant to discover which SAQ or SAQs he must use to comply with the PCI DSS. The merchant selects from a list that will categorize the specific account into the correct SAQ. For merchants with multiple accounts the wizard groups like accounts together so the merchant does not have to complete duplicate SAQs.

The Website interface element includes an interview module that provides a series of interactive questions, help screens and glossaries that enable a merchant to answer questions about his business and then translates them to SAQ answers. The Website interface allows the merchant to suspend an interview and resume in the same place at any time.

A task module provides tasks for each non-compliant question explaining the action needed for becoming compliant. Merchants then return to the system to certify completion as many times as needed to complete their documentation. When all tasks are complete the system requires the attestation of compliance from the merchant and records the result. When necessary, a policy module, based upon the merchant having or not having the required written policies, makes a downloadable file available to the merchant with the necessary policies. A reporting module provides the SAQ, task list and policies in download or print format.

II. Process Overview

Standards guidance system functions in the following manner. Individual databases and websites are created for each host organization (ISO and bank organizations.) These individual websites and databases are created to secure each host organization's data. The host organization creates a file that contains end-user or merchant information such as merchant ID, merchant name etc. This merchant file is then uploaded to the host organization's database creating individual merchant accounts. Each merchant account is identified with a merchant number and system assigned password. This account information is then distributed to the appropriate merchant along with information about how to access the web application.

Upon initial log in, the merchant is required to create a username and new password to access the application. The merchant is then prompted for the answers to a number of security questions that can be used later to reset passwords etc. A wizard is then used to allow the merchant to provide specific information such as contact names, numbers etc. The wizard also asks the merchant a series of questions designed to determine which SAQ Group the merchant's accounts should be assigned to. For example, a merchant may, at the end of the wizard, be assigned to SAQ Group A.

Once the merchant has completed the wizard, they are then prompted to begin the survey. A number of questions are asked, based on the SAQ Group that has been assigned, to determine the merchant's PCI DSS compliance status. These questions include questions about policy and procedure implementation as well as specific questions about individual compliance efforts.

At the conclusion of the survey, the merchant is presented with a list of tasks that must be completed in order to obtain PCI DSS compliance. These tasks may include the implementation of a policy, in which case an actual policy is attached, or the completion of a specific task such as the proper configuration of a router. The tasks include due dates that may be changed by the merchant. Once all tasks have been completed, a completed SAQ document(s) is(are) available for the merchant to print. Throughout the entire process the host organization has a number of reports available that contain information about the status of their merchant compliance.

III. Process Detail

Figure 4:
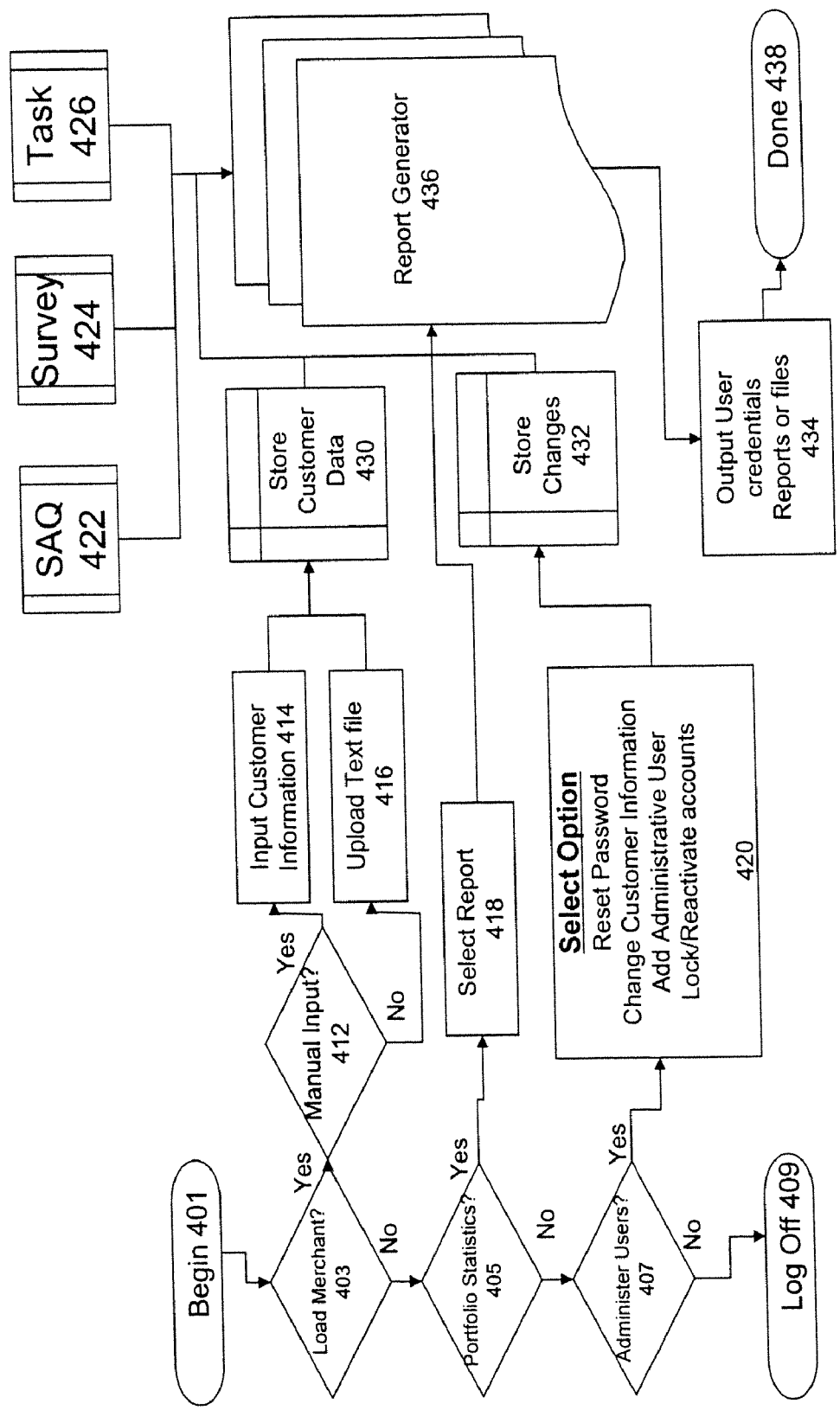
FIG. 4 is an administrative process diagram of a standards guidance system according to an embodiment of the present invention.

Referring now to FIG. 4, administrative process flow 400 demonstrates how a host places a merchant into the system and manages accounts. It shows how hosts place their customers in standards guidance system 125 so that the end-user may complete the required documents and obtain PCI DSS compliance and computer security. Administrative process flow 400 is carried out by the Website interface.

A host enters the standards guidance system 125 at step 401 and then has to select whether to enter a new merchant at step 403, review portfolio statistics at step 405 or perform administrative functions at step 407. If the host decides to do none of the above, he/she logs off at step 409.

If loading a new merchant is selected, then the host selects at step 412 either manual entry at step 414 or upload text file at step 416. The merchant data is stored at step 430. The data along with SAQ 422, Survey 424 and Task 426 are inputs to a report generator 436, which can then be output at step 434. The host then logs out at step 438.

If a host wants to review their portfolio of merchants and associated statistics such as for example, vulnerability, compliance status, length of time to complete compliance and other such issues, then the host selects the requisite report at step 418. The data along with SAQ 422, Survey 424 and Task 426 are inputs to report generator 436, which can then be output at step 434. The host then logs out at step 438.

If a host wants to amend administrative information such as for example, passwords, merchant information, re-activate account other such issues, then the host selects the requisite option at step 420. The data are inputs to client information and Website interface through Store Customer Data at step 430 and along with SAQ 422, Survey 424 and Task 426 are inputs to report generator 436, which can then be output at step 434. The host then logs out at step 438.

Figure 5:
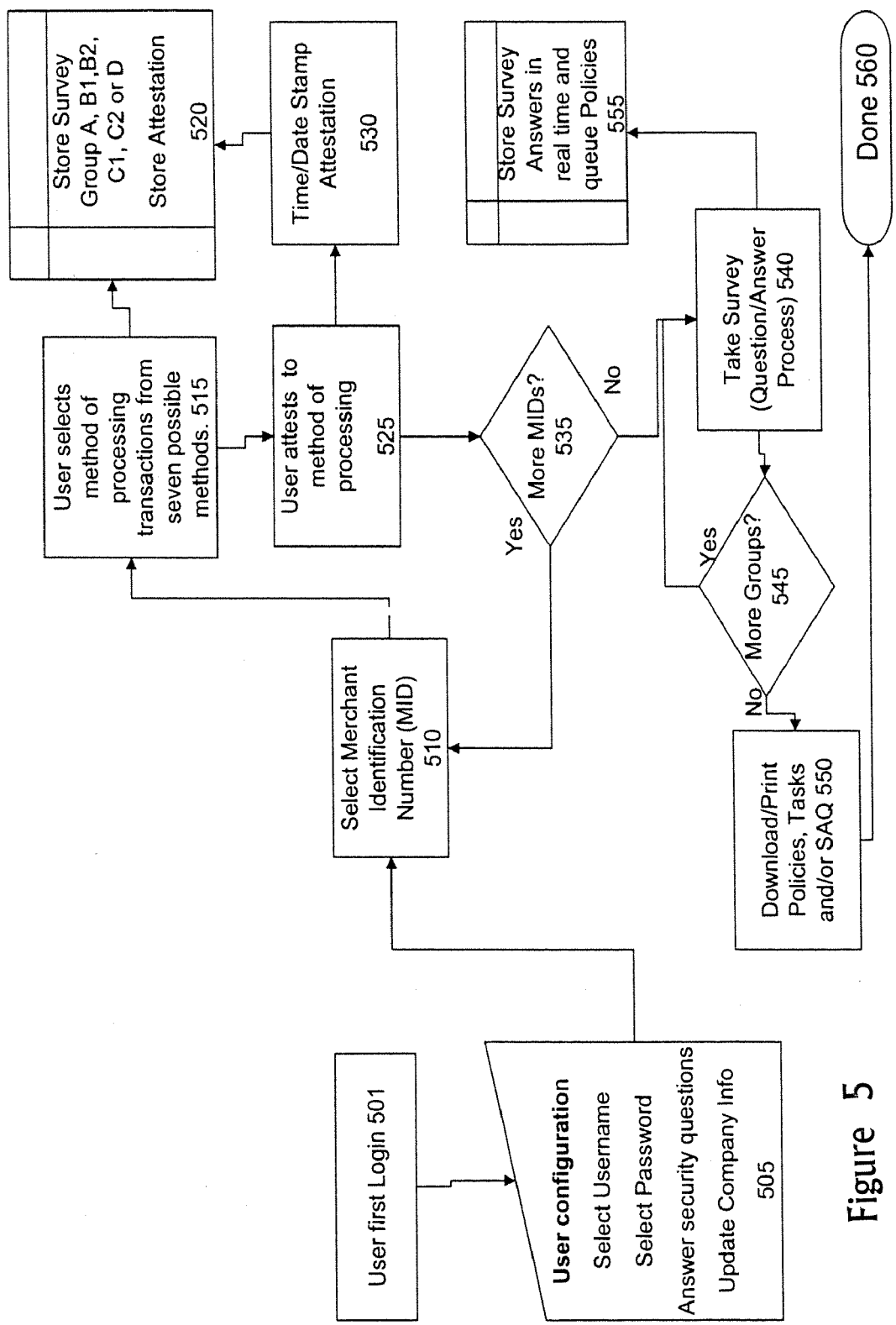
FIG. 5 is a survey wizard process diagram of a standards guidance system according to an embodiment of the present invention.

Referring now to FIG. 5, the survey wizard process 500 demonstrates how the interrelated processes combine to ensure the end-user enters into the correct survey(s) and completes the appropriate PCI DSS SAQ. It accurately selects one of six completion patterns related to four SAQ forms based upon the merchant processing configuration by using non-technical terms the end-user can understand. Survey wizard process flow 500 is carried out by Website interface.

An end-user logs in for the first time at step 501. The end-user enters in user configuration information at step 505. Each end-user may have multiple Merchant Identification Numbers ("MIDs") that correspond to multiple stores or multiple transaction points within a specific site, such as for example, a front desk, restaurant, or gift shop in a hotel. The end-user is therefore required to select the proper MID at step 510. The end-user then has to select one of the seven possible methods for processing a transaction at step 515, where the seven methods are: 1) all functions outsourced to a vendor with no data stored electronically or; 2) processes transactions with paper vouchers only with no data stored electronically or; 3) has a POS terminal attached only to a telephone line with no data stored electronically or; 4) has a POS terminal attached only to the Internet and not to any computer or network no data stored electronically or; 5) has a POS System attached to the Internet that is not connected to any other network or; 6) Stores credit card information on a computer or network or; 7) has a computer that processes transactions but does not store data. The end-user then attests to the method of processing at step 525, the attestation is then time-stamped at step 530 and both the method selected and attestation are stored at step 520. If more MIDs need to be processed at step 535, then the above process is repeated. The process groups together MIDs that are associated with the same transaction method for efficiency and consistency purposes. When all of the MIDs have been processed and grouped at step 515, then the end-user takes the survey at step 540 and the survey results are stored in step 555. If surveys have to be taken for additional groups at step 545, then steps 540 and 555 are repeated. Once each survey has been completed, the end-user can download the SAQ, any tasks, and any policies that have been generated at step 550. The end-user logs out at step 560. If multiple questions need the same task, the system only lists the required task once and in addition, all related tasks are grouped together in the task list.

Figure 6:
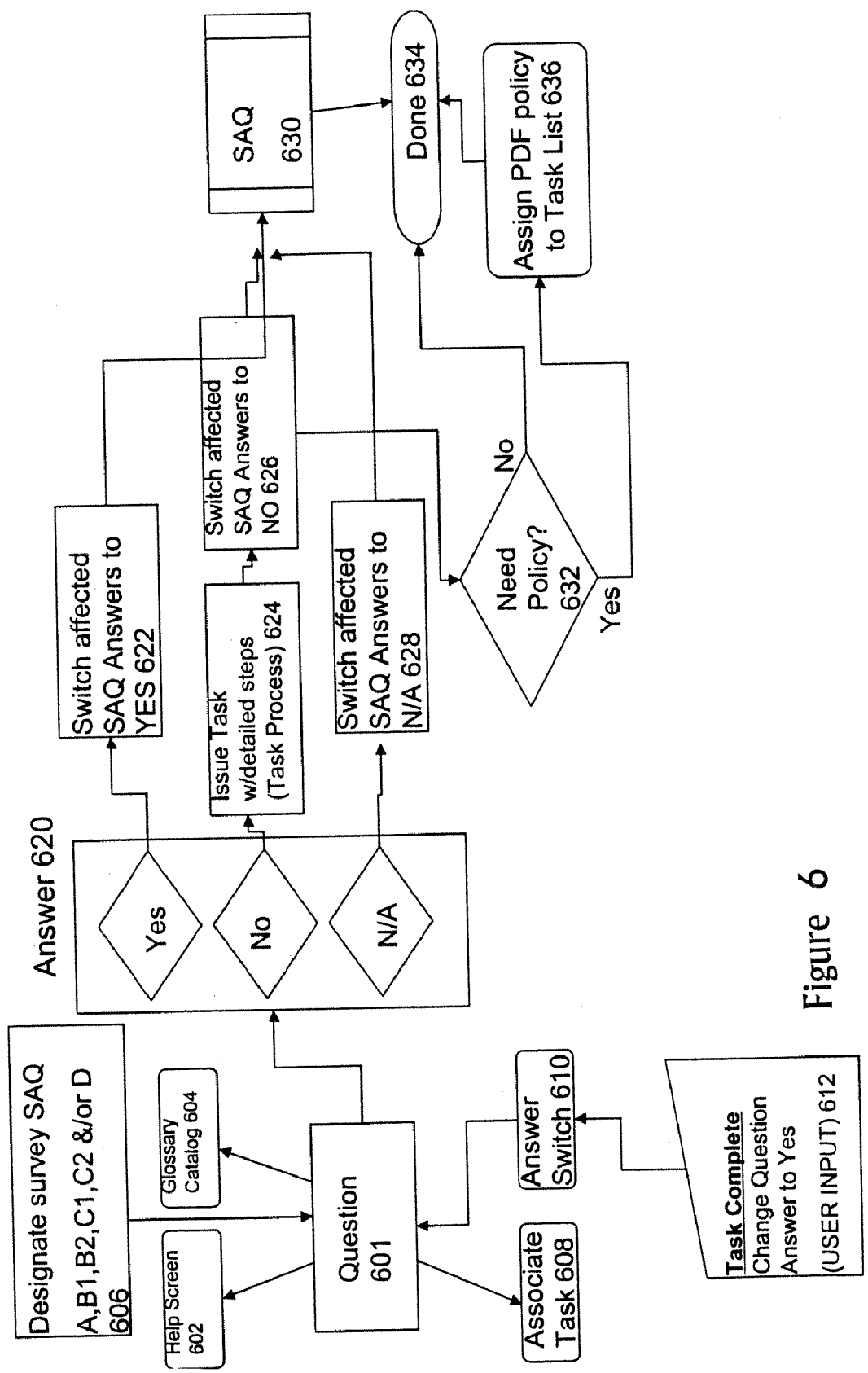
FIG. 6 is a survey question process diagram of a standards guidance system according to an embodiment of the present invention.

Referring now to FIG. 6, the survey question process 600 demonstrates logic controls and translation methodology for survey questions and their inputs to the SAQ Process 630 This process simplifies terms of computer security for technically challenged users to allow them to understand and complete the required PCI DSS SAQ. Survey question process flow 600 is carried out by the survey tool.

A question 601 is associated with a help screen 602 and a glossary catalog 604 to assist the end-user answer any questions by providing links to definitions and explanations. Each question is linked or associated with the type of SAQ survey 606, and task 608. An answer switch 610 captures the "yes", "no" or "N/A" selection of the end-user at step 620.

If the end-user's selection is "yes", then answer switch 610 is set to "yes" at step 622, SAQ 630 is updated at step 630 and this question is completed at step 634. If the end-user's selection is "no", then a task is issued at step 624, answer switch 610 is set to "no" at step 626 and SAQ 630 is updated at step 630. Whether a policy is required is then checked at step 632 and if so, a policy in a suitable format, such as for example, PDF, is attached to the task list at step 636. If no policy is needed, then this question is completed at step 634. If the end-user selects "N/A", then the answer switch is set to "N/A" and this question is completed at step 634. When the end-user has later completed a specific task, the user can re-enter the survey for the specific task and select "task complete" 612. This selection changes the answer switch 610 to "yes" for that question. See also discussion with respect to FIG. 7.

Figure 7:
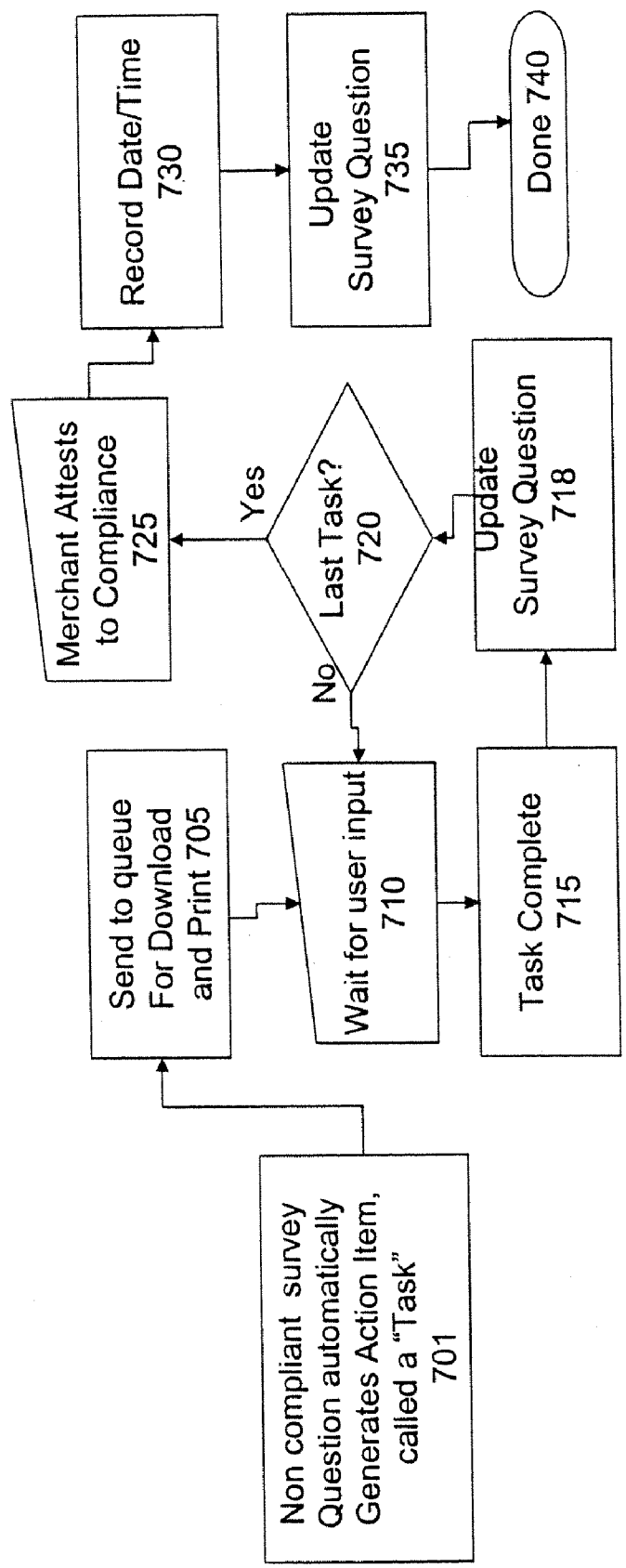
FIG. 7 is a task and attestation process diagram of a standards guidance system according to an embodiment of the present invention.

Referring now to FIG. 7, the task and attestation process 700 demonstrates processes where end-users keep track of open tasks and complete compliance documentation when done. It allows end-users to receive instruction and document completion of required tasks to meet the intent of the required PCI DSS SAQ. Task and attestation process flow 700 is carried out by the Website interface.

As stated above, when an end-user answers "no" to a question, a task is created at step 701 that is available for printing or downloading by the end-user at step 705. The survey then waits for the end-user to re-enter the process and provide updated information at step 710. When an end-user has selected that the task is complete at step 715, then the answer switch is updated and the survey question is updated at step 718. The process then determines if all tasks are complete at step 720. The process is repeated for any completed tasks. If all tasks are complete, then the end-user attests to compliance at step 725, which is then time-stamped at step 730. The relevant survey questions are then updated at step 735 and the end-user logs out at step 740.

Figure 8:
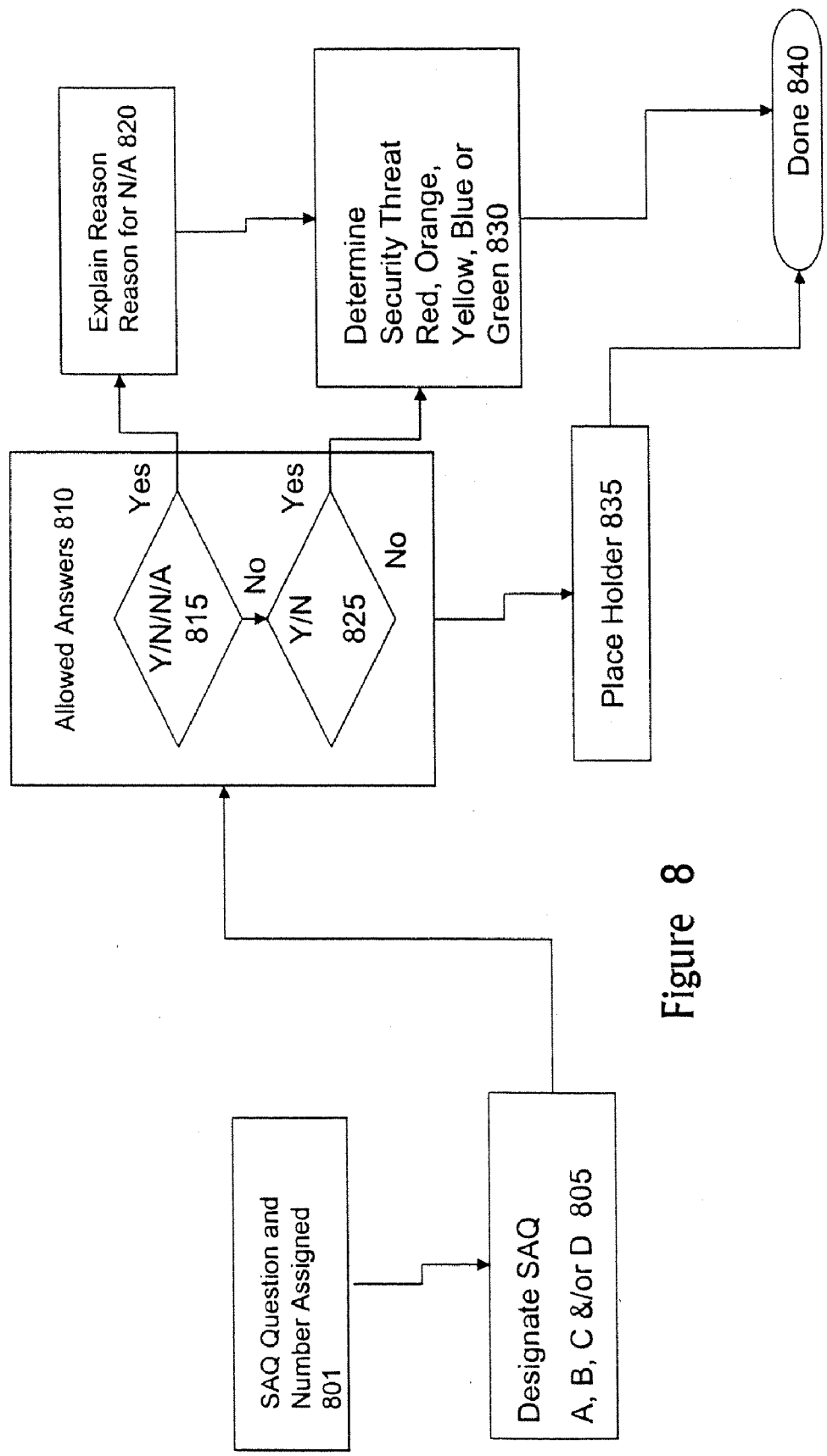
FIG. 8 is an SAQ translation process diagram of a standards guidance system according to an embodiment of the present invention.

Referring now to FIG. 8, the SAQ translation process 800 demonstrates relationships between Survey Questions, Answers and Vulnerability Groups. It translates the PCI DSS SAQ into a machine usable number format, catalogues all the text in all the questions on all four SAQs, designates all possible actions and answers, and categorizes security threats for risk analysis. SAQ translation process flow 800 is carried out by the SAQ Process 330.

A question is added to the system exactly as it appears on the PCI DSS SAQ document at 801.

A designation is entered at 805 for each SAQ form that uses the question, for example, do you broadcast your SSID, is used on SAQ C and D, but not on SAQ A or B.

The allowed answers are set in the system at 810 from three possibilities; 1) Yes/No 825, 2) Yes, No or N/A 815, 3) placeholder 835. When an N/A answer is given a reason must be displayed on the SAQ form. The reason for N/A is written at 820 and stored for future use.

The non-compliant state is evaluated for its comparative security threat; Red, Orange, Yellow or Blue at 830 and are explained later. Green levels are calculated by the system in the administrative process by the report generator at 436. Green is displayed on the SAQ process only for information and illustration.

Place holders at 835 are designated when a line number is used to control sub-questions but does not itself have an answer. For example, Question 12.9 Asks: "Has an incident response plan been implemented to include the following?," leading to 12.9.1(a) & (b). 12.9 is addressed by specific questions 12.9.1(a) & (b) and does not require an answer. A placeholder is used at 835 to cause the unanswered question to appear on the resulting form and excludes it from the risk assessment calculations.

Figure 9:
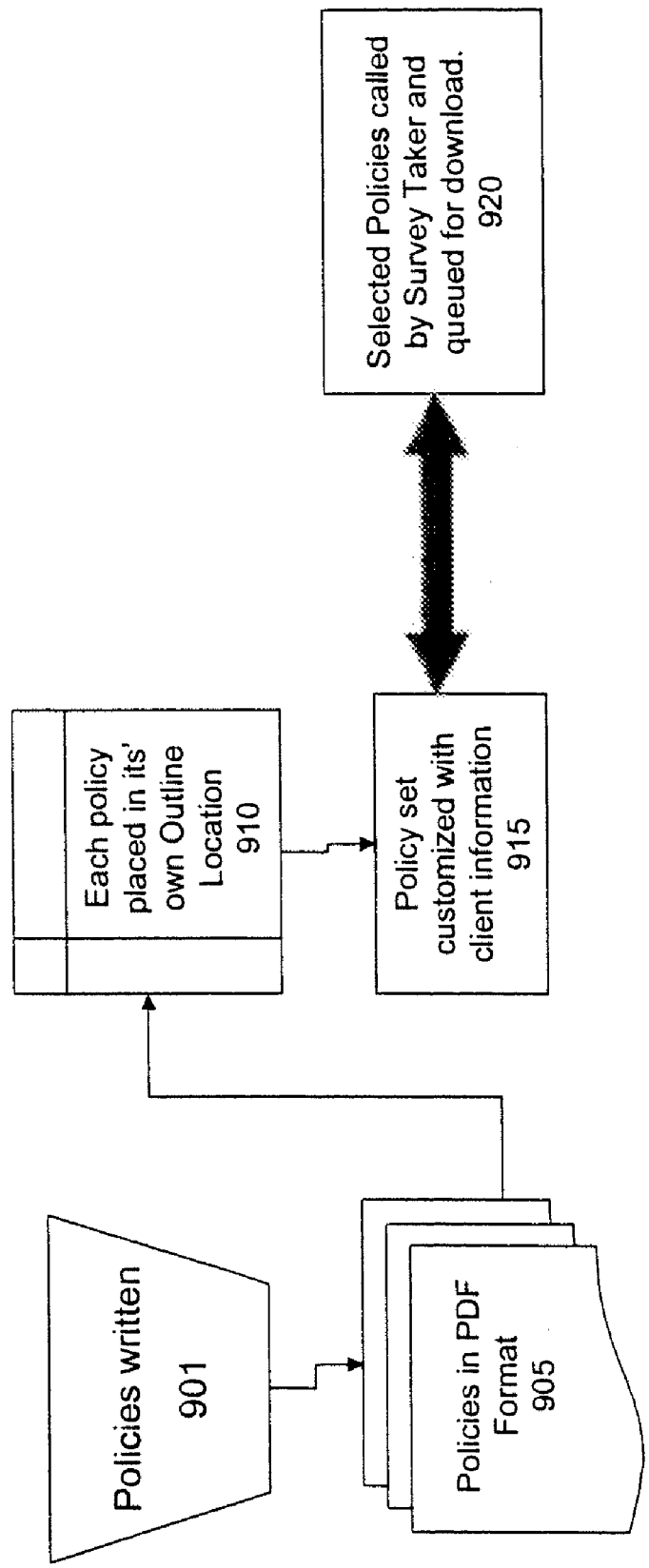
FIG. 9 is an outline process diagram of a standards guidance system according to an embodiment of the present invention.

Referring now to FIG. 9, an outline process 900 demonstrates how policies are placed in the system for later assignment to merchant users to download. It provides written policies for businesses to use to manage computer security. Policies are written 901, converted for use in a suitable format 905 and stored in a designated place for easy retrieval 910. Each policy, when required, is customized with the host's specific information at step 915. Selected policies are called by the survey taker and are queued for download and printing at step 920. Outline process flow 900 is carried out by the outline tool.

Figure 10:
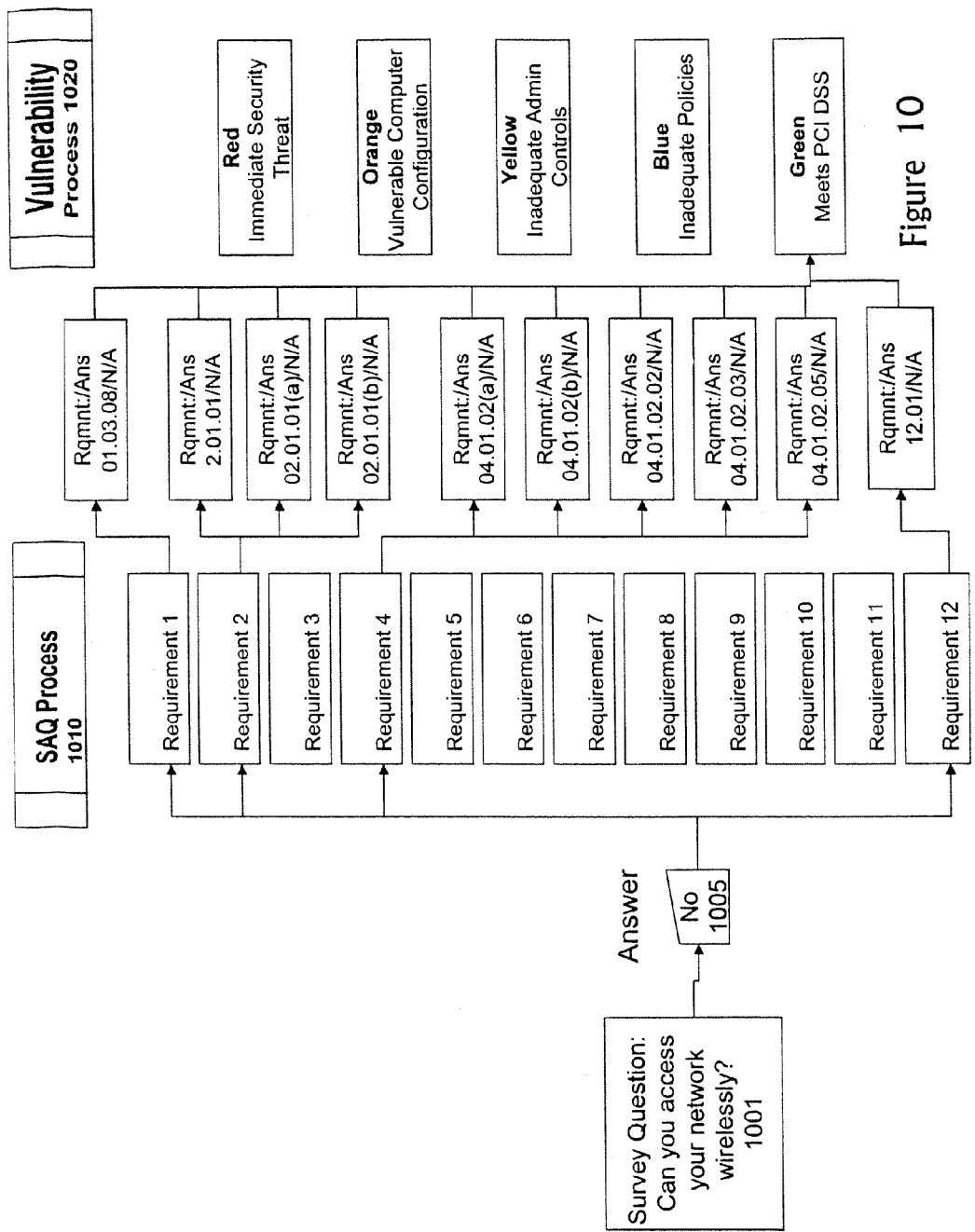
FIGS. 10 and 11 are question/answer process diagrams of a standards guidance system according to an embodiment of the present invention.

Referring now to FIG. 10, the Question/Answer process 1000 demonstrates the effect of answering a single question with a "NO" answer and to show how the processes interrelate to drive SAQ production efficiently and create inputs to the Vulnerability and Risk Process. It creates a labor extensive (saving) process for end-users that translates user inputs to all affected requirements in the PCI DSS SAQ. Question/Answer process flow 1000 is controlled by the survey tool and carried out by the SAQ process.

When an end-user answers a sample question, such as for example, "Can you access your network wirelessly?" 1001 with a "no" answer at step 1005, then SAQ process 1010 automatically populates a set of answer switches to "N/A". For example, affected answer switches of Requirements 1, 2, 4 and 12 are automatically set to "N/A". This then propagates to vulnerability process 1020, which automatically determines that the end-user is PCI DSS compliant and no longer designates a vulnerability. As previously stated, the report generator at 436 evaluates non-no answers to 'green" for reporting and analysis.

Figure 11:
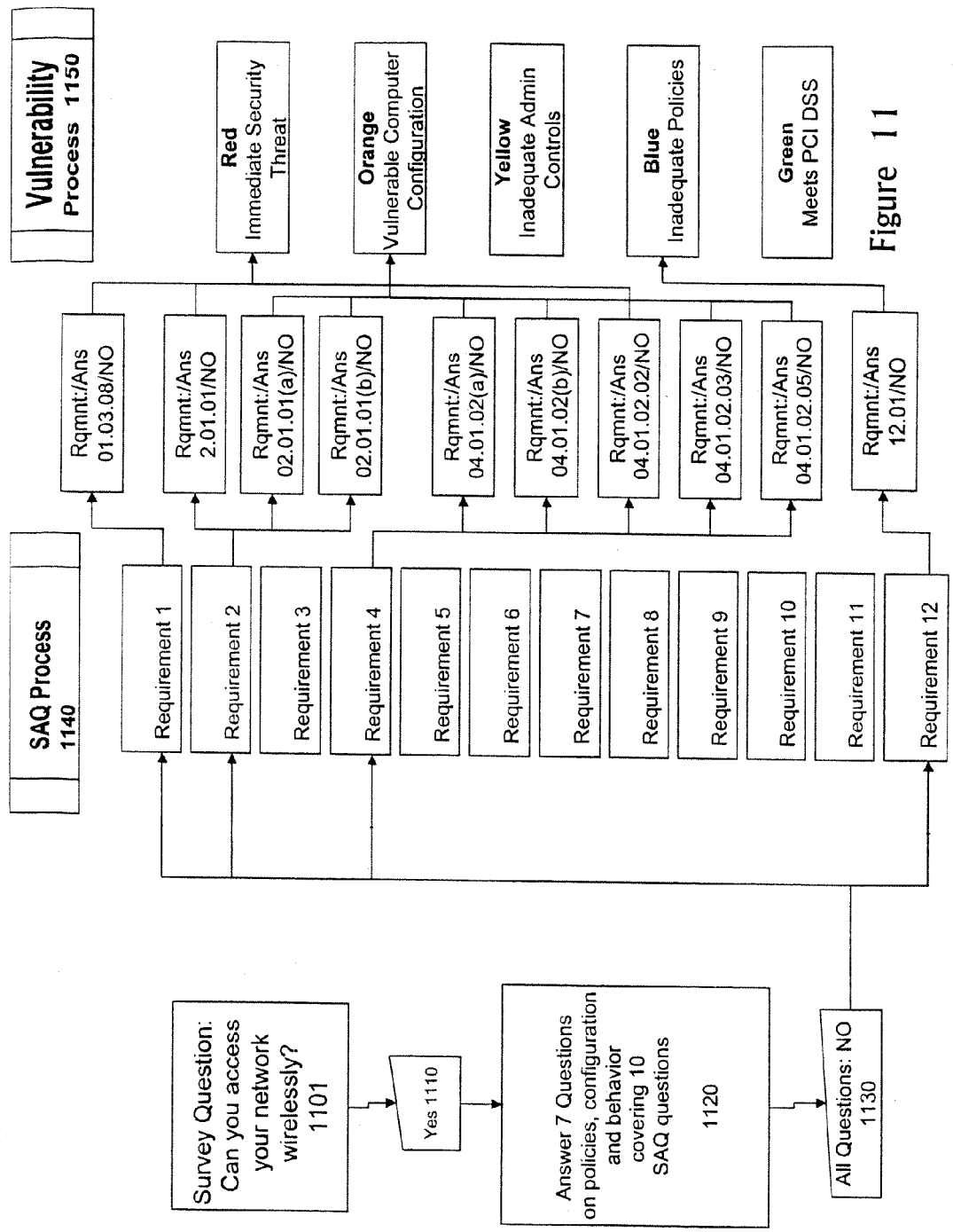

Referring now to FIG. 11, if an end-user answers the "Can you access your network wirelessly?" 1101 with a "yes" answer at step 1110, then the end-user is required to answer a set of additional questions regarding access and other related wireless security issues at step 1120. If the end-user answers "no" to all such questions at step 1130, then SAQ process 1140 automatically populates a set of answer switches to "no". For example, all answer switches of Requirements 1, 2, 4 and 12 are automatically set to "no". This then propagates to vulnerability process 1150. In this case, sub-requirements from the same requirement may lead to different vulnerability levels and sub-requirements from the different requirements may go to the same level. For example, in Requirement 2, sub-requirements 02.01.01(a) and 02.01.01(b) are designated as "orange" level, indicating a vulnerable computer configuration and sub-requirement 2.01.01 is designated as a "red" level, indicating immediate security threat level.

Figure 12:
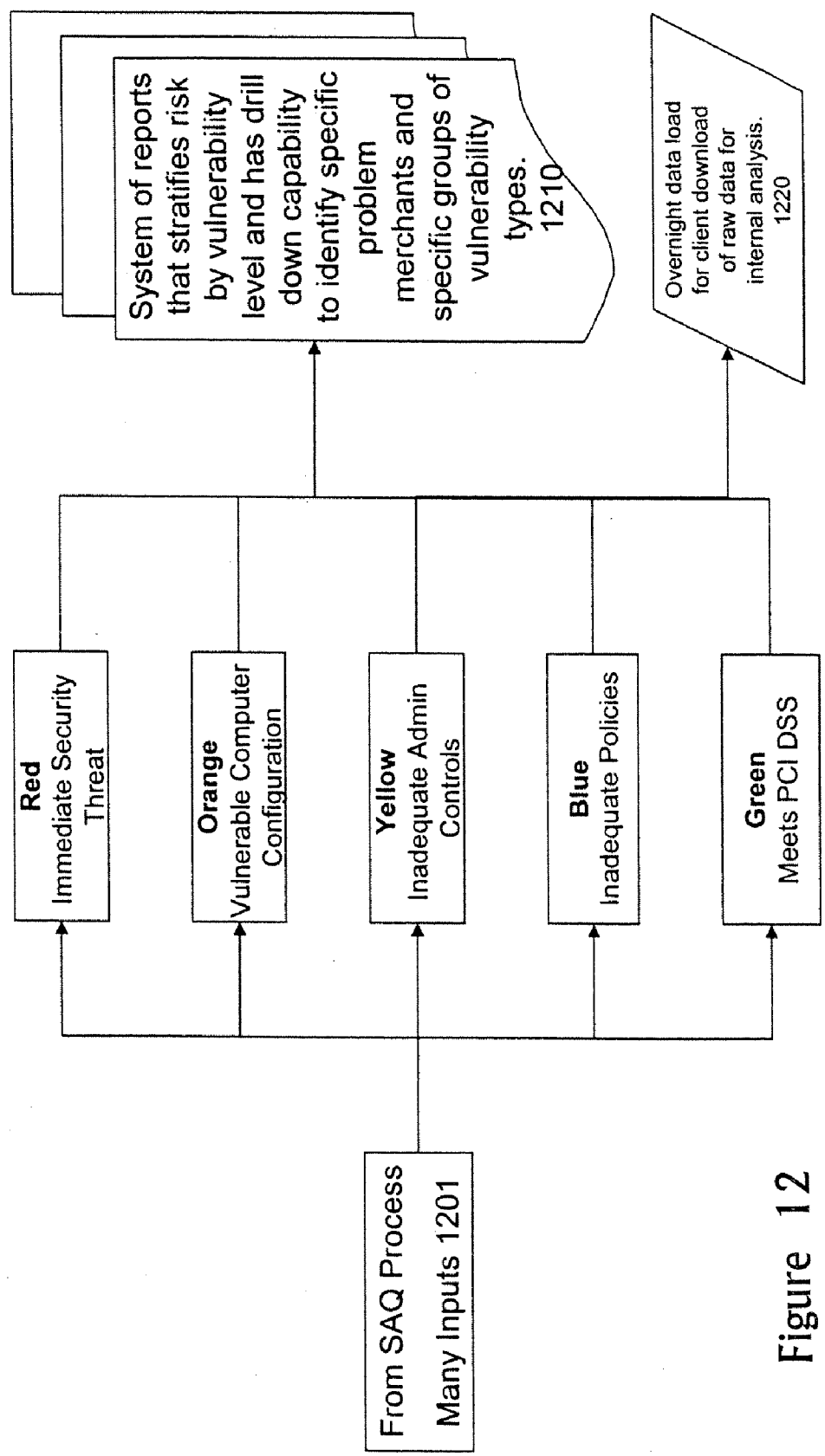
FIG. 12 is a risk and vulnerability management process diagram of a standards guidance system according to an embodiment of the present invention.

Referring now to FIG. 12, risk and vulnerability management process 1200 demonstrates results of feeding Survey Questions/Answers through the SAQ into Vulnerability Groups. It enables and accomplishes a system for risk analysis and assessment for hosts/clients to use to remediate security threats that their end-users cause when storing or handling credit, debit or stored value card data.

SAQ process object 330 provides multiple inputs for processing at step 1201. Each SAQ answer is analyzed and one of four designated vulnerability levels is assigned. A "red" vulnerability level indicates an immediate security threat. For example, a "red" vulnerability level may relate to 1) requirements for a firewall at each Internet connection and between any demilitarized zone (DMZ) and the internal network zone; 2) does the firewall configuration restrict connections between publicly accessible servers and any system component storing cardholder data, including any connections from wireless networks; or 3) (is the) database in an internal network zone, segregated from the DMZ. An "orange" vulnerability level indicates vulnerable computer configuration. For example, an "orange" vulnerability level may relate to 1) secure and synchronize router configuration files; 2) are SSID broadcasts disabled; 3) is storage of cardholder data kept to a minimum, and is storage amount and retention time limited to that which is required for business, legal, and/or regulatory purposes; or 4) is access to keys restricted to the fewest number of custodians necessary. A "yellow" vulnerability level indicates inadequate administrative controls. For example, a "yellow" vulnerability level may relate to 1) is there a formal process for approving and testing all external network connections and changes to the firewall configuration; 2) is there a current network diagram with all connections to cardholder data, including any wireless networks; 3) is there a description of groups, roles, and responsibilities for logical management of network components; 4) is there a quarterly review of firewall and router rule sets; or 5) have configuration standards been developed for all system components. A "blue" vulnerability level indicates inadequate policies. For example, a "blue" vulnerability level may relate to 1) are policies, procedures, and practices in place to preclude the sending of unencrypted PANs by e-mail; or 2) are standards appropriately updated to address new vulnerability issues. The vulnerability levels and associated information are then presented in a stratified report that provides drill down capability to identify problem end-users or spot specific vulnerability levels in step 1210. The reports also allow the end-users to concentrate on higher level problems before tackling lower level problems. The raw data can also be provided to the host for further analysis in step 1220.

In summary, a comparative risk evaluation places a security value on the PCI DSS SAQ items to allow hosts/clients to assess the risk that a particular end-user or group of end-users places on the host portfolio of end-users. Compliance items are assigned a value of the relative vulnerability a noncompliant item presents to a computer or system. Linkage occurs via the Interview SAQ tool. 5 categories evaluate the elements of risk from red, immediate vulnerability to green, compliant. End-user tasks are grouped by these categories so that businesses are able to work on higher vulnerability items first. Management information is then provided via exception reporting that allows a host analyst to "drill down" and view the specific failures in their end-user's security program. A series of reports and data analysis can be performed under this process enabling rapid adaptation to changes in the risk profile and general security conditions. The risk evaluation is controlled by the SAQ, Report Generator and Survey Tools allowing this risk analysis to be performed without engineering support.

A method for providing standards guidance to a user including generating a hierarchical list of payment card questions from predetermined requirements questionnaire resulting in positive, negative or non-applicable answers. Selecting a question set responsive to selection by the user of a transaction type for a transaction site. Presenting a series of questions from the question set to the user. Processing each answer by propagating and populating answer list in the predetermined requirements questionnaire. Issuing a task if answer to question is negative. Attaching a policy statement if answer is negative and policy is required. Determining a vulnerability level based on answers to the series of questions. Time-stamping user attestation for the answer. Generating SAQ with any applicable tasks and policy statements. The hierarchical list of payment card questions is variable with respect to the number of questions on the predetermined requirements questionnaire.

It will be apparent to those skilled in the art that various modifications and variations may be made in the apparatus and process of the present invention without departing from the spirit or scope of the invention. Thus, it is intended that the present invention cover the modification and variations of this invention provided they come within the scope of the appended claims and the equivalents thereof.

What is claimed is:

1. A computer for processing credit card standards guidance information for a business, the computer comprising:
   memory having at least one region for storing computer executable program code; and
   processor for executing the program code stored in the memory, wherein the program code comprises:
   code for receiving a master question set and a first question set, each set including a plain language, simplified translation of technical questions based on at least one of a plurality of Payment Card Industry Data Security Standard Self Assessment Questionnaires regarding how a user merchant business processes credit card transactions;
   code for transmitting for display the first question set to the user;
   code for receiving a first answer set from the user in response to the first question set;
   code for transmitting for display a first attestation to the user that the business conforms to a first technical standard relating to the first answer set and receiving a first attestation response from the user;
   code for identifying a merchant type of the user based on the first answer set, wherein the merchant type relates to a card processing methodology of the user and wherein when the user has two or more locations of the same merchant type, the user's answers apply to those two or more locations of the same merchant type;
   code for transmitting for display to the user a second question set selected from the master question set based on the merchant type, and allowing the user to skip a question in the second question set, whereupon it is represented up to three times in the second question set, after which the question is flagged for inclusion as a corrective action task;
   code for receiving a second answer set from the user including positive, negative, or non-applicable answers in response to the second question set and simultaneously populating an answer list in a predetermined requirements questionnaire based on the second answer set;
   code for generating and transmitting for display a corrective action task to the user when an answer within the second answer set indicates non-compliance with a Payment Card Industry Data Security Standard within at least one of the plurality of Self Assessment Questionnaires;
   code for transmitting for display to the user a third question set regarding processes of the business in the area of the first attestation, wherein the third question set includes questions selected from the master question set and excluding predetermined questions deemed not applicable based on the second answer set;
   code for receiving a third answer set from the user including only positive and negative answers in response to the third question set and automatically populating the answer list in the predetermined requirements questionnaire based on the third answer set, and allowing the user to skip a question in the third question set, whereupon it is represented up to three times in the third question set, after which the question is flagged for inclusion as a corrective action task;
   code for generating and transmitting for display a corrective action task to the user when an answer within the third answer set indicates non-compliance with a Payment Card Industry Data Security Standard within at least one of the plurality of Self Assessment Questionnaires;
   code for generating and transmitting for display to the user a corrective action plan including a hierarchical list of the corrective action tasks based on a Payment Card Industry Security Standards Council document, where the corrective action tasks are generated based on answers within the second or third answer set as applicable that indicate non-compliance with the Payment Card Industry Security Standards Council document, and where the corrective action tasks have been grouped by relevance and de-duplicated;
   code for transmitting for display a second attestation to the user regarding completion of the corrective action tasks wherein the user is asked to certify each corrective action task is complete;
   code for receiving and time-stamping second attestation responses from the user addressing each corrective action task and code for automatically updating answers in the second or third answer set as applicable and automatically updating at least one of the plurality of Self Assessment Questionnaires based on the second attestation responses;
   code for transmitting for display a third attestation to the user including a confirmation of overall compliance and an acknowledgement that the user must maintain continuous Payment Card Industry compliance and receiving and time-stamping a third attestation response and a user identity from the user;
   code for generating a confirmed Self Assessment Questionnaire from among the plurality of Self Assessment Questionnaires based on the first answer set, the first attestation response, the second answer set, the third answer set, the second attestation responses, and the third attestation response; and
   code for generating exception reports identifying failures to satisfy the Self Assessment Questionnaires based on the responses for one or more users and transmitting the exception reports to a host associated with the one or more users for use in automated and manual risk management processes.

2. The computer of claim 1, wherein when user selects "non-applicable" as an answer in the second answer set, code for populating the answer list automatically selects a predetermined acceptable reason for "non-applicability" for that question and inserts that predetermined acceptable reason into the Self Assessment Questionnaire for that question and for predetermined related questions.

3. The computer of claim 1, further comprising code for transmitting an implementable administrative business policy when an answer in the second answer set indicates a policy is required.

4. The computer of claim 1, wherein the first question set includes questions regarding whether the business processes credit card transactions using one of a terminal that is Internet connected; a stand-alone terminal that is telephone connected; using paper receipts and card imprinter with no terminal; a commercial point of sale system on a single computer and not connected to any other system or network; a virtual terminal without a peripheral device; a virtual terminal with a peripheral device; or a computer that is connected to another system or network and/or stores card numbers and/or has payment processing application that is not qualified under The Payment Application Validation Data Security Standard (PA DSS) and listed on the List of Validated Payment Applications.

5. The computer of claim 1, wherein a deadline for each corrective action task may be extended by request of the user.

6. The computer of claim 1, wherein the third attestation is an overall attestation that the user confirms his overall compliant status acknowledging that the user has answered honestly and agrees that the user is obligated to maintain the compliance with the standard at all times.

7. A non-transitory tangible computer-readable medium having computer executable software code stored thereon, the code for processing credit card standards guidance information for a business, the code comprising:
  code for receiving a master question set and a first question set, each set including a plain language, simplified translation of technical questions based on at least one of a plurality of Payment Card Industry Data Security Standard Self Assessment Questionnaires regarding how a user merchant business processes credit card transactions;
  code for transmitting for display the first question set to the user and receiving a first answer set from the user in response to the first question set;
  code for transmitting for display a first attestation to the user that the business conforms to a first technical standard relating to the first answer set and receiving a first attestation response from the user;
  code for identifying a merchant type of the user based on the first answer set, wherein the merchant type relates to a card processing methodology of the user and wherein when the user has two or more locations of the same merchant type, the user's answers apply to those two or more locations of the same merchant type;
  code for transmitting for display to the user a second question set selected from the master question set based on the merchant type, and allowing the user to skip a question in the second question set, whereupon it is represented up to three times in the second question set, after which the question is flagged for inclusion as a corrective action task;
  code for receiving a second answer set from the user including positive, negative, or non-applicable answers in response to the second question set and simultaneously populating an answer list in a predetermined requirements questionnaire based on the second answer set;
  code for generating and transmitting for display a corrective action task to the user when an answer within the second answer set indicates non-compliance with a Payment Card Industry Data Security Standard within at least one of the plurality of Self Assessment Questionnaires;
  code for transmitting for display to the user a third question set regarding processes of the business in the area of the first attestation, wherein the third question set includes questions selected from the master question set and excluding predetermined questions deemed not applicable based on the second answer set;
  code for receiving a third answer set from the user including only positive and negative answers in response to the third question set and automatically populating the answer list in the predetermined requirements questionnaire based on the third answer set, and allowing the user to skip a question in the third question set, whereupon it is represented up to three times in the third question set, after which the question is flagged for inclusion as a corrective action task;
  code for generating and transmitting for display a corrective action task to the user when an answer within the third answer set indicates non-compliance with a Payment Card Industry Data Security Standard within at least one of the plurality of Self Assessment Questionnaires;
  code for generating and transmitting for display to the user a corrective action plan including a hierarchical list of corrective action tasks based on a Payment Card Industry Security Standards Council document, where the corrective action tasks are generated based on answers within the second answer set that indicate non-compliance with the Payment Card Industry Security Standards Council document, and where the corrective action tasks have been grouped by relevance and de-duplicated;
  code for transmitting for display a second attestation to the user regarding completion of the corrective action tasks wherein the user is asked to certify each corrective action task is complete;
  code for receiving and time-stamping second attestation responses from the user addressing each corrective action task and code for automatically updating answers in the second or third answer set as applicable and automatically updating at least one of the plurality of Self Assessment Questionnaires based on the second attestation responses;
  code for transmitting for display a third attestation to the user including a confirmation of overall compliance and an acknowledgement that the user must maintain continuous Payment Card Industry compliance and receiving and time-stamping a third attestation response and a user identity from the user;
  code for generating a confirmed Self Assessment Questionnaire from among the plurality of Self Assessment Questionnaires based on the first answer set, the first attestation response, the second answer set, the third answer set, the second attestation responses, and the third attestation response; and
  code for generating exception reports identifying failures to satisfy the Self Assessment Questionnaires based on the responses for one or more users and transmitting the exception reports to a host associated with the one or more users for use in automated and manual risk management processes.

8. The non-transitory tangible computer-readable medium of claim 7, wherein when user selects "non-applicable" as an answer in the second answer set, code for populating the answer list automatically selects a predetermined acceptable reason for "non-applicability" for that question and inserts that predetermined acceptable reason into the Self Assessment Questionnaire for that question and for predetermined related questions.

9. The non-transitory tangible computer-readable medium of claim 7, further comprising code for transmitting an implementable administrative business policy when an answer in the second answer set indicates a policy is required.

10. The non-transitory tangible computer-readable medium of claim 7, wherein the first question set includes questions regarding whether the business processes credit card transactions using one of a terminal that is Internet connected; a stand-alone terminal that is telephone connected; using paper receipts and card imprinter with no terminal; a commercial point of sale system on a single computer and not connected to any other system or network; a virtual terminal without a peripheral device; a virtual terminal with a peripheral device; or a computer that is connected to another system or network and/or stores card numbers and/or has payment processing application that is not qualified under The Payment Application Validation Data Security Standard (PA DSS) and listed on the List of Validated Payment Applications.

11. The non-transitory tangible computer-readable medium of claim 7, wherein a deadline for each corrective action task may be extended by request of the user.

12. The non-transitory tangible computer-readable medium of claim 7, wherein the third attestation is an overall attestation that the user confirms his overall compliant status acknowledging that the user has answered honestly and agrees that the user is obligated to maintain the compliance with the standard at all times.

* * * * *